J. S. TIBBETS. Carriages.
117,829. Fig. 1. Patented August 8, 1871.
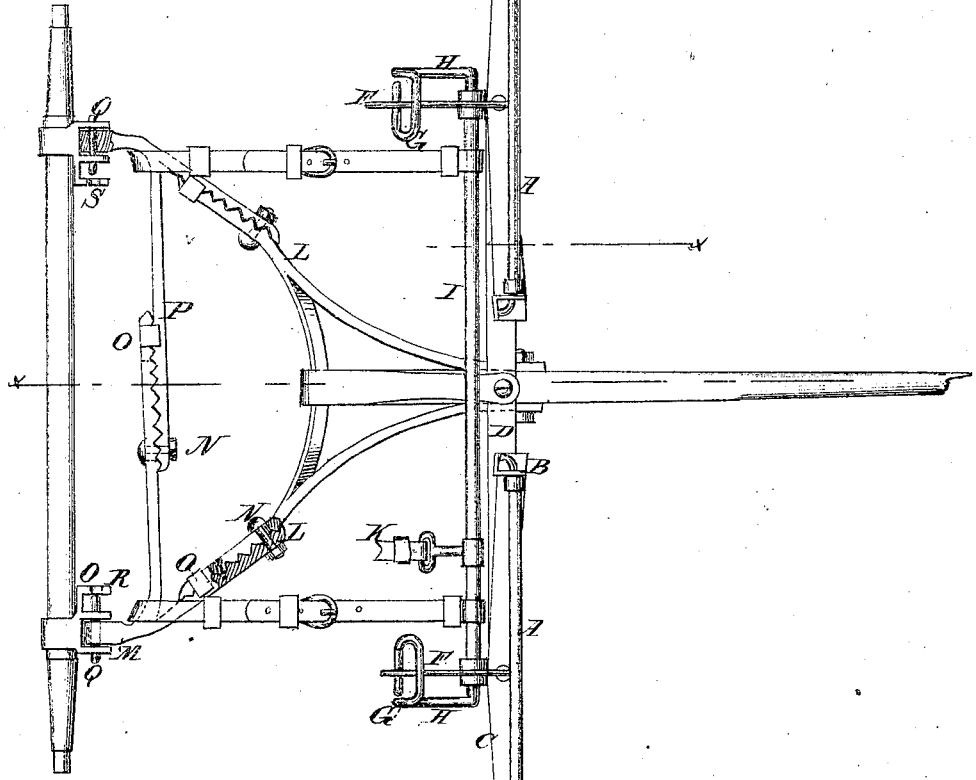
Fig. 2.
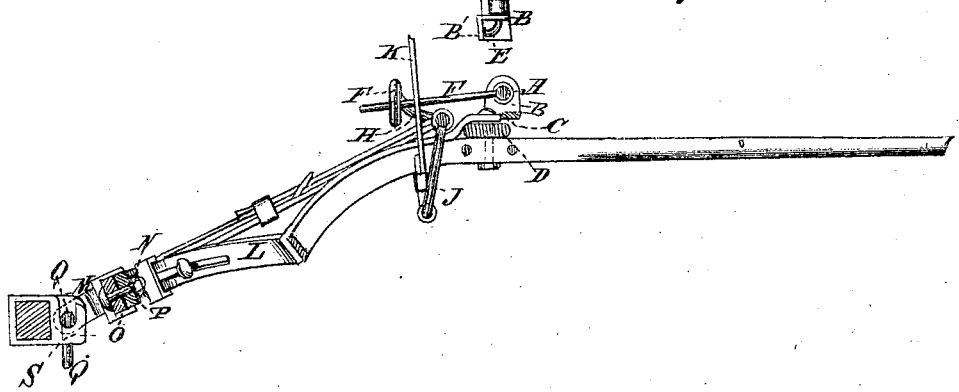

UNITED STATES PATENT OFFICE.

JONATHAN S. TIBBETS, OF BRAZIL, INDIANA.

IMPROVEMENT IN DRAFT DEVICES FOR VEHICLES.

Specification forming part of Letters Patent No. 117,829, dated August 8, 1871.

*To all whom it may concern:*

Be it known that I, JONATHAN S. TIBBETS, of Brazil, in the county of Clay and State of Indiana, have invented new and useful Improvements in Carriages; and I do hereby declare that the following is a full, clear, and exact description thereof, which will enable others skilled in the art to make and use the same, reference being had to the accompanying drawing forming part of this specification.

This invention relates to improvements in road-carriages; and it consists in a novel safety-detaching apparatus for disengaging the team if it becomes ungovernable. It also consists in an adjustable arrangement of the tongue, whereby it is adapted for attaching to carriages in which the clips are more or less distant from each other; and it also consists in improvements in the clips and connecting-pins for preventing the latter from falling out.

Figure 1 is a plan view of parts of a carriage, showing my improvements; and Fig. 2 is a section of the same taken on the line $x\ x$ of Fig. 1.

Similar letters of reference indicate corresponding parts.

The whiffletrees A are journaled at each end in an angle-ear or bracket, B, rising up from a plate, C, pivoted on the double-tree or evener D in the same manner that whiffletrees usually are; and the latter have the hooked projections E from the ends for hitching the traces to, which they hold securely when the whiffletrees are turned to and held in the position shown in the drawing—that is, with the bent ends against the rear parts B' of the angle-ears; but when the ends of these projections are so as to project forward the traces will escape from them, as will be clearly understood by inspection of the drawing. The whiffletrees have a short lever, F, projecting laterally from the center rearward, and passing through a yoke, G, on the end of an arm or crank, H, of a shaft, I, journaled in suitable bearings on the evener to oscillate, and this shaft has an arm, J, projecting downward and rearward a short distance. A strap, K, is connected to the free end of this arm, and extends upward to any suitable place within convenient reach of the driver, so that by pulling it upward the whiffletree will be revolved and the projections turned forward to let the traces escape when required.

I propose to make the arms L adjustable, to move the ends M toward or from each other for attaching to different carriages in which the clips vary as to the distance of one from the other. For this purpose I make them in two parts, with serrated faces lapping each other, and clamped together by a bolt, N, and clip, capable of allowing them to be moved lengthwise for lengthening and shortening, the bolt passing through a slot in one part and the clip sliding on the other. The cross-bar P is made adjustable in like manner for admitting of this adjustment.

For preventing the bolts Q which connect the tongue to the clips, from working out, I propose to have an elongated head, Q', extended in one direction from the axis so as to prevent it from turning by the gravity of the said head after being inserted; and I apply a guard-plate at one side of the clip, with a notch, S, in the upper edge, by which the bolt can only be inserted when the head is turned upward, and which will effectually prevent the escape of the bolt after being inserted and turned down.

I also propose to shape these heads like the bolts in form and dimensions, to enable me to use them for the bolts, when the latter are worn too small, by simply reversing them.

Having thus described my invention, I claim as new and desire to secure by Letters Patent—

1. The whiffletrees, provided with the hooked projections E, and mounted in the angle-ears B B' of the plates C, the latter being pivoted to the evener, all substantially as specified.

2. The revolving whiffletrees, provided with an arm, F, and combined with the revolving shaft I, having the yokes G and the strap K, all substantially as specified.

3. The tongue, having the adjustable arms L, and bar P, for adapting it to connect with clips at different distances apart, all substantially as specified.

4. The notched guard-plates, and the bolts Q with elongated and weighted heads Q', in combination with the clip-irons and adjustable serrated arms L L of the tongue, as shown and described.

JONATHAN S. TIBBETS.

Witnesses:
 JOSEPH BLAIR,
 A. J. McCULLOUGH.